(No Model.)

A. R. MOORE.
ANIMAL POKE.

No. 422,820. Patented Mar. 4, 1890.

Witnesses,
J. M. Withrow,
R. H. Bishop,

Inventor,
Andrew R. Moore,
By his Attorneys,
C. A. Snow & Co.

UNITED STATES PATENT OFFICE.

ANDREW R. MOORE, OF CHARLOTTE, MICHIGAN, ASSIGNOR OF ONE-HALF TO WILLIAM J. BYERS, OF SAME PLACE.

ANIMAL-POKE.

SPECIFICATION forming part of Letters Patent No. 422,820, dated March 4, 1890.

Application filed September 24, 1889. Serial No. 324,899. (No model.)

*To all whom it may concern:*

Be it known that I, ANDREW R. MOORE, a citizen of the United States, residing at Charlotte, in the county of Eaton and State of Michigan, have invented a new and useful Animal-Poke, of which the following is a specification.

My invention relates to improvements in animal-pokes; and it consists in certain novel features hereinafter described and claimed.

Figure 1:
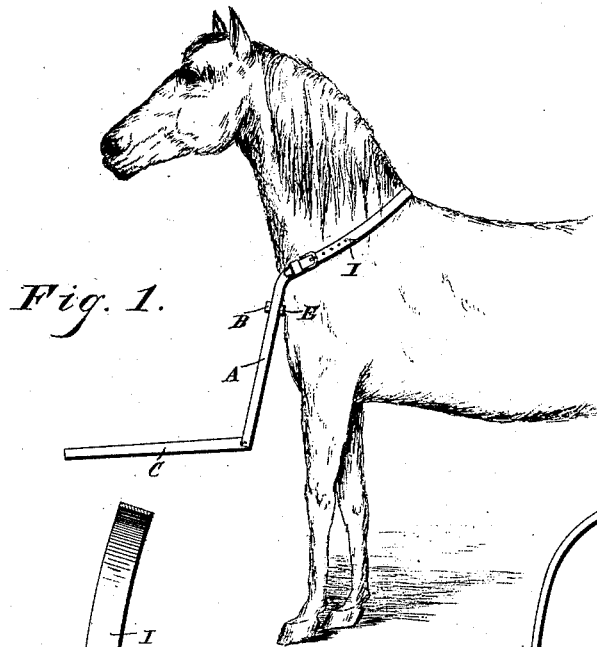
Figure 2:
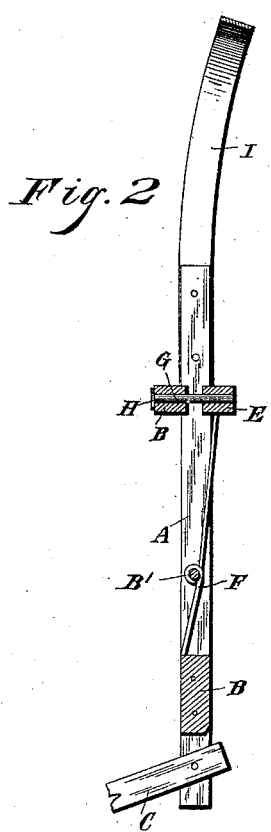
Figure 3:
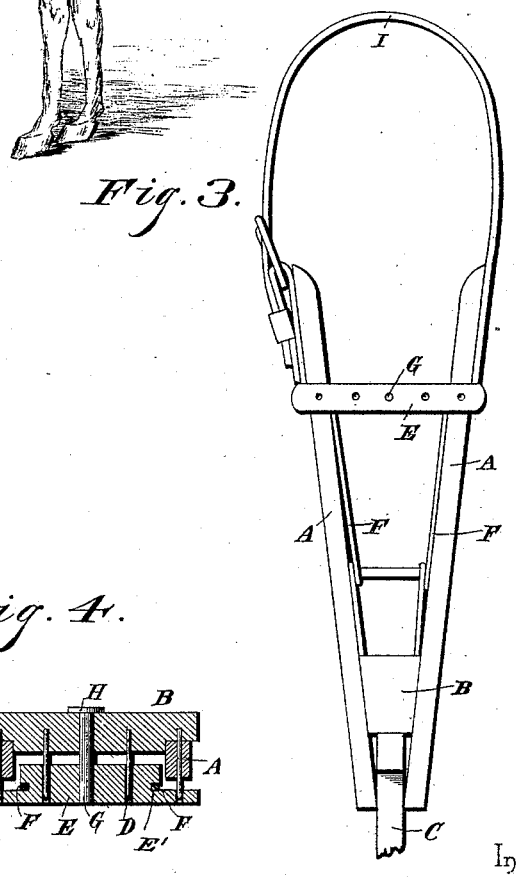
Figure 4:
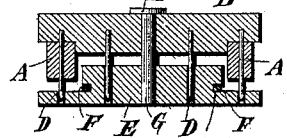

In the drawings, Figure 1 is a side view showing my improved poke in position on an animal. Fig. 2 is a central longitudinal section of the poke. Fig. 3 is a rear elevation, and Fig. 4 is an enlarged horizontal section through the upper cross-bar and slide.

In carrying out my invention I employ a yoke consisting of the downwardly-converging side bars A A and cross-bars B B, secured to and connecting the said side bars. Between the lower ends of the side bars A A, I pivot the poke-bar C, which extends forward therefrom a suitable distance, as clearly shown.

To the upper cross-bar B and to the side bars in the line of the said cross-bar I secure the rearwardly-projecting spurs D, which are covered by the slide E, and this slide is normally projected rearward by the opposite springs F, which are secured at their lower ends to the lower cross-bar B, and have their upper ends engaging notches E' in the ends of the slide E, as shown, the springs intermediate their ends being coiled about a central cross-bar B', connecting the side bars A. The slide is held to its place and prevented from being thrown off the points of the spurs by a pin G, secured to the slide and passing through the upper cross-bar B, and provided at its front end with an annular shoulder or head H, which impinges against the front side of said cross-bar to limit the movement of the slide.

The device is secured on the animal by a strap I, extending from the upper ends of the side bars A and adapted to pass around the neck of the animal.

In practice the poke is secured in position, as shown in the drawings, by passing the strap I around the neck of the animal, so that the slide E will bear against its breast, and the poke-bar will project forward beyond its head. It will be seen that the upper ends of the side bars A are a considerable distance apart, and the upper cross-bar B is located some distance below their extreme upper ends. By this construction not only will the diverging of these side bars adapt the device to different widths of neck, but the breathing of the animal will be uninterrupted and free, because the slide E rests against his breast, and his wind-pipe is not pressed upon, as is common in devices of this character. In addition to this, these upper ends of the side bars rest firmly upon the shoulder-joints of the fore legs, thus taking all undesirable and abnormal pressure off the chest or neck; and it will thus be understood that the strap I need not be drawn uncomfortably tight. Should the animal attempt to jump a fence, the poke-bar will strike against the fence and be thereby pushed backward, so that the weight of the animal will be thrown against the slide E, causing the said slide E to move up along the spurs and expose the points thereof, which will then prick the animal. When the animal moves away from the fence, the springs at once throw the slide over the ends of the spurs, as will be readily understood.

From the foregoing description, taken in connection with the accompanying drawings, it will be seen that I have provided a device which is very light and which can be quickly and easily secured on the animal. The downwardly-converging arrangement of the slide-bars arranges the upper ends of the same some distance apart and gives the frame a V-shaped form, so that it can be readily drawn up over a small neck and easily fitted over a large neck. The slide prevents the spurs lacerating and tearing the flesh of the animal, while at the same time it permits them to prick him should he attempt to jump a fence or interfere with other animals.

The device is not cumbersome, and consequently is comfortable to the animal and does not interfere with his feeding.

Having thus described my invention, what I claim, and desire to secure by Letters Patent, is—

The herein-described animal-poke, the same consisting of the opposite side bars A, converged at their lower ends, the poke-bar C, pivoted between the same, the upper crossbar B, secured to the front of the side bars and provided with the headed guiding-bolt G and spurs D, the neck-strap I, the lower crossbar B, the central bar B', the slide-bar E, perforated to receive the spurs and guide-bolt and provided with end notches E', and the opposite spring-arms F, having their lower ends secured to the lower cross-bar B, their opposite ends terminating in the shoulders of the sliding block and their intermediate portions coiled about the bar B', substantially as specified.

In testimony that I claim the foregoing as my own I have hereto affixed my signature in presence of two witnesses.

ANDREW R. MOORE.

Witnesses:
PARM S. DeGRAFF,
WILLIAM J. BYERS.